Patented Mar. 12, 1940

2,193,676

UNITED STATES PATENT OFFICE 2,193,676

WATER-INSOLUBLE AZO DYESTUFFS

Friedrich Wilhelm Muth, Leverkusen-I. G.-Werk, Germany, assignor to General Aniline & Film Corporation, a corporation of Delaware No Drawing. Application April 5, 1938, Serial No. 200,076. In Germany April 12, 1937

12 Claims. (Cl. 260—192)

The present invention relates to new water-insoluble azodyestuffs and to fibers dyed with the new dyestuffs; more particularly, it relates to water-insoluble azodyestuffs obtainable from amides of 3-hydroxy-fluorene-2-carboxylic acids.

My new coupling components are obtainable by converting 3-hydroxyfluorene-2-carboxylic acids having a free 4-position or the functional derivatives thereof into the amides of aromatic or heterocyclic mono- or diamines. These can be effected by starting from the halides or esters of the said carboxylic acids and causing the same to react with aromatic or heterocyclic mono- or diamines or by reacting aromatic or heterocyclic isocyanic acid esters with the 3-hydroxy-fluorene-2-carboxylic acids. The 3-hydroxy-2-carboxylic acids which serve as starting materials for the above process can be obtained according to my copending application Ser. No. 200,128 of even date and titled: "Ortho-hydroxy carboxylic acids."

The new amides may be substituted in that benzene nucleus of the fluorene which does not bear the hydroxy group and the carboxylic acid amide group. As substituents may be mentioned alkyl, alkoxy, nitro, halogen, trifluoromethyl, phenylamino, alkylsulfone, aralkylsulfone, arylsulfone, alkyl-CO-, aryl-CO- and so on; also a further nucleus may be condensed to the mentioned benzene nucleus of the fluorene, forming in this way, for instance, a naphthalene ring system or, in case the nucleus condensed to the fluorene is hydrogenated, a tetrahydronaphthalene ring system. Such substituted amides can be obtained e. g. from the following 3-hydroxy-fluorene-2-carboxylic acids: the methyl-3-hydroxy-fluorene-2-carboxylic acids, the chloro-3-hydroxyfluorene-2-carboxylic acids, the methoxy-3-hydroxyfluorene-2-carboxylic acids, which bear the substituent in question in one of the positions 5, 6, 7 or 8; further the benzo-3-hydroxyfluorene-2-carboxylic acids having the benzene nucleus condensed to the positions 5.6, 6.7 or 7.8 and also the corresponding tetrahydro-acids.

My new amides show in comparison with other amides derived from multinuclear o-hydroxy-carboxylic acids a good solubility; thus they dissolve in general already in hot aqueous lyes. They are distinguished by a very good affinity towards cellulosic fibers and by a good coupling energy.

Now it has been found that the new amides not only have a good affinity to the cellulosic fiber which is one essential prerequisite for the formation of azodyestuffs on the fiber, but are also able to combine with diazo compounds to azo dyestuffs of valuable and unexpected properties.

The new dyestuffs are obtainable by diazotizing in the usual manner a primary amine suitable for preparing azodyestuffs and coupling in substance or on a substratum, especially on the cellulosic fiber with the above described amides of 3-hydroxyfluorene-2-carboxylic acids. Since these new dyestuffs are to be water insoluble, the components are chosen in such a manner that they are free from water solubilizing groups. Depending on the components employed the azo-dyestuffs thus formed exhibit various shades, particularly khaki to olive-khaki shades, which, when produced on the fiber, are distinguished by excellent fastness properties.

The following examples illustrate the invention, without however restricting it thereto, the parts being by weight:

Example 1

226 parts of 3-hydroxyfluorene-2-carboxylic acid and 123 parts of 2-anisidine are suspended in toluene. 60 parts of phosphorus trichloride are dropped in at 60° C. and the whole heated to boiling until the formation of hydrochloric acid is complete. Sodium carbonate solution is added to the reaction mixture until it has assumed a strongly alkaline reaction and the toluene is then removed by evaporation. The residue is purified by dissolving it with dilute caustic soda lye and precipitating with acid. By crystallization from alcohol or toluene, the new arylide of the formula:

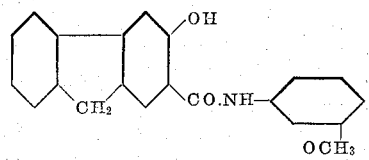

is obtained in short monosymmetrical prisms having a melting point of 176–177° C.

The arylamide obtained in an analogous manner with 1-amino-2.5-dimethoxybenzene has the following formula:

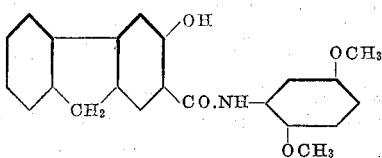

and crystallizes from toluene in yellow needles of M. P. 186–187° C.

In the following table the melting points are given of further amides of 3-hydroxyfluorene-2-carboxylic acid with amines such as

| | Melting-point °C. |
|---|---|
| Aniline | 246 |
| 2-toluidine | 211 |
| 3-toluidine | 232 |
| 4-toluidine | 265 |
| 2-aminoethylbenzene | 168 |
| 2-anisidine | 177 |
| 3-anisidine | 213 |
| 4-anisidine | 263 |
| 2-phenetidine | 168 |
| 3-chloroaniline | 233 |
| 4-chloroaniline | 284 |
| 3-fluoroaniline | 244 |
| 3-aminobenzotrifluoride | 225 |
| 3-nitroaniline | 288 |
| 1-amino-2.3-dimethylbenzene | 230 |
| 1-amino-2.4-dimethylbenzene | 206 |
| 1-amino-2.5-dimethylbenzene | 169 |
| 1-amino-3.4-dimethylbenzene | 227 |
| 1-amino-3.5-dimethylbenzene | 207 |
| 1-amino-2-methyl-4-methoxybenzene | 228 |
| 1-amino-2-methyl-5-methoxybenzene | 160 |
| 1-amino-3-methyl-4-methoxybenzene | 200 |
| 1-amino-3-methyl-6-methoxybenzene | 210 |
| 1-amino-4-methyl-3-methoxybenzene | 202 |
| 1-amino-2-methyl-4-chlorobenzene | 236 |
| 1-amino-2-methyl-5-chlorobenzene | 238 |
| 1-amino-2.4-dimethoxybenzene | 153 |
| 1-amino-2.5-dimethoxybenzene | 187 |
| 1-amino-2-methoxy-4-chlorobenzene | 232 |
| 1-amino-2-methoxy-5-chlorobenzene | 215 |
| 1-amino-4-methoxy-3-chlorobenzene | 230 |
| 1-amino-2.4-dimethoxy-5-chlorobenzene | 249 |
| 1-amino-2.5-dimethoxy-4-chlorobenzene | 232 |
| 1-amino-2-methoxy-5-methyl-4-chlorobenzene | 212 |
| 2-naphthylamine | 270 |
| α-Tetrahydronaphthylamine | 205 |
| Dianisidine (with 2 mols acid) | more than 300 |

In the same way the amides of substituted 3-hydroxy-fluorene-2-carboxylic acids are obtained. 6-methyl-3-hydroxy-fluorene-2-carboxylic acid yields, with 2-anisidine, the product of the following formula

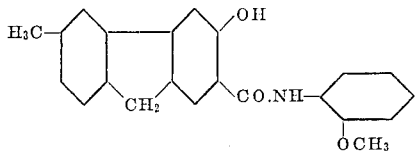

which melts at 172° C. The corresponding amides with

| | °C. |
|---|---|
| 2-toluidine has the melting-point | 217 |
| 1-amino-2.5-dimethoxybenzene has the melting-point | 189 |
| 1-amino-2.5-dimethoxy-4-chlorobenzene has the melting-point | 206 | and the 6.7-benzo-3-hydroxyfluorene-2-carboxylic acid yields, with 2-anisidine, an amide of the formula

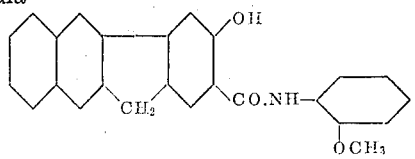

which melts at 210° C., and with 1-amino-2.5-dimethoxybenzene, an amide of the melting-point 230° C.

*Example 2*

Cotton yarn is heated at 30° C. for ½ hour with a solution containing per litre 3 parts of 1'-(3-hydroxyfluorene-2-carboylamino)-2'-methoxybenzene, 10 parts of caustic soda lye of 34° Bé. and a protective colloid. The yarn is freed from the liquid and the dyestuff is then developed for ½ hour in a diazo solution which contains 2.85 parts per litre of 1-amino-2-methoxy-benzene-5-sulfodiethylamide and excess sodium acetate; then the yarn is rinsed and soaped. Strong greenish khaki shades of good boiling properties and fastness to chlorine are thus obtained. It is remarkable that the shades obtained in this manner are not changed when soaped.

In the following table there are mentioned further dyestuffs and shades which have been obtained in accordance with the said method of working:

| Coupling component | Diazo component | Shade |
|---|---|---|
| 1'-(3-hydroxyfluorene-2-carboylamino)-2'-methoxybenzene. | 1-amino-2-methyl-5-chlorobenzene | Khaki. |
| Do | 2-amino-4-chloro-diphenylether | Yellowish brown. |
| Do | 1-amino-4-benzoylamino-2-chloro-5-methoxybenzene | Orange brown. |
| Do | 1-amino-2-chloro-5-trifluoromethylbenzene | Khaki. |
| Do | 1-amino-2.5-dichlorobenzene | Yellowish brown. |
| Do | 1-amino-2-methoxybenzene-5-benzylsulfone | Greenish khaki. |
| Do | 1-amino-2-methoxy-5-chlorobenzene | Khaki. |
| Do | 4-amino-2'3-dimethyl-1.1'-azobenzene | Brown. |
| 1'-(3-hydroxyfluorene-2-carboylamino)-2'.5'-dimethoxybenzene. | 1-amino-2-methoxybenzene-5-sulfodiethylamide | Greenish khaki. |
| 3-hydroxyfluorene-2-carboylamino benzene | 3-chloroaniline | Yellow olive. |
| Do | 1-amino-2-chloro-5-benzotrifluoride | Yellowish. |
| Do | 1-amino-2-methyl-5-nitrobenzene | Greenish khaki. |
| Do | 1-amino-2-methyl-3-chlorobenzene | Olive brown. |
| Do | 1-amino-2-methyl-4-chlorobenzene | Yellowish khaki. |
| Do | 1-amino-2-methyl-5-chlorobenzene | Brown olive. |
| Do | 1-amino-2-methoxy-5-chlorobenzene | Brownish olive. |
| Do | 1-amino-2-methoxy-benzene-5-benzylsulfone | Greenish khaki. |
| Do | 2-amino-4-chlorodiphenylether | Brownish olive. |
| Do | 2-amino-4.4'-dichlorodiphenylether | Do. |
| 1'-(3-hydroxyfluorene-2-carboylamino)-2'-methylbenzene. | 1-amino-2-chloro-5-benzotrifluoride | Yellowish khaki. |
| Do | 1-amino-2-methyl-5-nitrobenzene | Khaki. |
| Do | 1-amino-2-methyl-3-chlorobenzene | Do. |
| Do | 1-amino-2-methoxy-5-chlorobenzene | Olivish brown. |
| Do | 1-amino-2-methoxybenzene-5-benzylsulfone | Khaki. |
| Do | 4-amino-2'.4'-dimethyl-2-nitro-5-methoxy-1.1'-azobenzene. | Dark-brown. |
| 1'-(3-hydroxyfluorene-2-carboylamino)-3'-methylbenzene | 1-amino-2-methyl-5-nitrobenzene | Greenish khaki. |
| Do | 1-amino-2-methyl-5-chlorobenzene | Khaki. |
| Do | 1-amino-2-methoxy-5-nitrobenzene | Olive. |
| Do | 1-amino-2-methoxy-5-chlorobenzene | Do. |
| Do | 1-amino-2-chloro-5-benzotrifluoride | Greenish khaki. |

| Coupling component | Diazo component | Shade |
|---|---|---|
| 1'-(3-hydroxyfluorene-2-carboylamino)-3-methylbenzene | 2-amino-4-chloro-diphenylether | Olive. |
| Do | 2-amino-4,4'-dichlorodiphenylether | Do. |
| 1'-(3-hydroxyfluorene-2-carboylamino)-4'-methylbenzene | 1-amino-2-methyl-5-nitrobenzene | Greenish khaki. |
| Do | 1-amino-2-methyl-3-chlorobenzene | Yellowish khaki. |
| Do | 1-amino-2-methyl-5-chlorobenzene | Do. |
| Do | 1-amino-2-methoxybenzene-5-sulfodiethylamide | Greenish khaki. |
| Do | 1-amino-2-trifluoromethyl-4-chlorobenzene | Yellow olive. |
| Do | 2-amino-4-chlorodiphenylether | Olive. |
| Do | 2-amino-4,4'-dichlorodiphenylether | Do. |
| 1'-(3-hydroxyfluorene-2-carboylamino)-2'-ethylbenzene | 3-chloro-aniline | Yellow-olive. |
| Do | 1-amino-2-chloro-5-trifluoromethylbenzene | Yellowish khaki. |
| Do | 1-amino-3,5-di(trifluoromethyl)benzene | Yellow-brown. |
| Do | 2,5-dichloroaniline | Do. |
| Do | 1-amino-2-methyl-4-nitrobenzene | Olive. |
| Do | 1-amino-2-methyl-5-nitrobenzene | Yellowish khaki. |
| Do | 1-amino-2-methoxy-5-nitrobenzene | Greenish khaki. |
| Do | 1-amino-2-methyl-3-chlorobenzene | Yellowish khaki. |
| Do | 1-amino-2-methyl-4-chlorobenzene | Do. |
| Do | 1-amino-2-methyl-5-chlorobenzene | Do. |
| Do | 1-amino-2-methoxy-5-chlorobenzene | Olive brown. |
| Do | 1-amino-2-methoxybenzene-5-sulfodiethylamide | Greenish khaki. |
| Do | 2-amino-4-chlorodiphenylether | Olive brown. |
| Do | 2-amino-4,4'-dichlorodiphenylether | Greenish khaki. |
| 1'-(3-hydroxyfluorene-2-carboylamino)-3'-methoxybenzene | 1-amino-2-methyl-5-nitrobenzene | |
| Do | 1-amino-methoxy-5-nitrobenzene | Do. |
| Do | 1-amino-2-chloro-5-trifluoromethylbenzene | Yellowish khaki. |
| Do | 1-amino-2-methyl-5-chlorobenzene | Khaki. |
| Do | m-Amino-azotoluene | Dark-brown. |
| 1'-(3-hydroxyfluorene-2-carboylamino)-4'-methoxybenzene | 1-amino-2-methyl-3-chlorobenzene | Khaki. |
| Do | 1-amino-2-methyl-5-chlorobenzene | Do. |
| Do | 1-amino-2-methoxybenzene-5-sulfodiethylamide | Do. |
| Do | 1-amino-2-methoxy-benzene-5-benzylsulfone | Yellowish brown. |
| Do | 2-amino-4-chloro-diphenylether | Olivish black-brown. |
| 1'-(3-hydroxyfluorene-2-carboylamino)-2'-ethoxybenzene | 2,5-dichloroaniline | Olive-yellow. |
| Do | 1-amino-2-methoxy-5-nitrobenzene | Greenish khaki. |
| Do | 1-amino-2-methoxy-5-chlorobenzene | Yellowish khaki. |
| Do | 1-amino-2-methoxy-benzene-5-sulfodiethylamide | Greenish khaki. |
| Do | 1-amino-2-methoxy-benzene-5-benzylsulfone | Do. |
| 1'-(3-hydroxyfluorene-2-carboylamino)-3'-chlorobenzene | 2-chloroaniline | Yellowish khaki. |
| Do | 3-chloroaniline | Do. |
| Do | 1-amino-2-methyl-5-nitrobenzene | Greenish khaki. |
| Do | 1-amino-2-methyl-5-chlorobenzene | Do. |
| Do | 1-amino-2-methoxy-benzene-5-sulfodiethylamide | Olive-khaki. |
| Do | 1-amino-2-methoxy-benzene-5-benzylsulfone | Do. |
| Do | 1-amino-2-chloro-5-trifluoromethylbenzene | Greenish khaki. |
| 1'-(3-hydroxyfluorene-2-carboylamino)-4'-chlorobenzene | 3-chloroaniline | Do. |
| Do | 1-amino-2-chloro-5-trifluoromethylbenzene | Do. |
| Do | 1-amino-2-methyl-5-nitrobenzene | Olivish khaki. |
| Do | 1-amino-2-nitro-4-methoxybenzene | Khaki. |
| Do | 1-amino-2-nitro-3-chlorobenzene | Do. |
| Do | 1-amino-2-nitro-5-chlorobenzene | Do. |
| Do | 1-amino-2-methoxy-5-chlorobenzene | Olive. |
| Do | 1-amino-2-methoxy-benzene-5-sulfodiethylamide | Olive-khaki. |
| Do | 1-amino-2-methoxy-benzene-5-benzylsulfone | Dark-olive. |
| Do | 1-amino-2-methoxy-benzene-5-ethylsulfone | Olivish khaki. |
| Do | 2-amino-4-chloro-diphenyloxide | Black-olive. |
| Do | 2-amino-4,4'-dichloro-diphenyloxide | Do. |
| 1'-(3-hydroxyfluorene-2-carboylamino)-3'-fluorobenzene | 2-chloroaniline | Yellowish khaki. |
| Do | 3-chloroaniline | Khaki. |
| Do | 2,5-dichloroaniline | Olivish brown. |
| Do | 1-amino-2-chloro-5-trifluoromethylbenzene | Yellowish khaki. |
| Do | 1-amino-4-chloro-2-trifluoromethylbenzene | Yellow-olive. |
| Do | 1-amino-2-methyl-5-nitrobenzene | Greenish khaki. |
| Do | 1-amino-2-methoxy-5-nitrobenzene | Olive. |
| Do | 1-amino-2-methyl-5-chlorobenzene | Olive-brown. |
| Do | 1-amino-2-methoxy-5-chlorobenzene | Olive. |
| Do | 1-amino-4-benzoylamino-2-chloro-5-methoxybenzene | Yellowish brown. |
| Do | 2-amino-4-chlorodiphenylether | Olive. |
| Do | 2-amino-4,4'-dichlorophenylether | Do. |
| 1'-(3-hydroxyfluorene-2-carboylamino)-3'-trifluoromethyl-benzene | 3-chloroaniline | Greenish khaki. |
| Do | 2,5-dichloroaniline | Yellow olive. |
| Do | 1-amino-2-methyl-5-nitrobenzene | Greenish khaki. |
| Do | 1-amino-2-methoxy-5-nitrobenzene | Do. |
| Do | 1-amino-2-chloro-5-trifluoromethylbenzene | Do. |
| Do | 1-amino-4-chloro-2-trifluoromethylbenzene | Yellow olive. |
| Do | 1-amino-2-methoxy-benzene-5-benzylsulfone | Khaki. |
| Do | 2-aminodiphenylsulfone | Greenish khaki. |
| Do | 2-amino-4-chloro-diphenylether | Olive. |
| Do | 2-amino-4,4'-dichlorodiphenylether | Do. |
| 1'-(3-hydroxyfluorene-2-carboylamino)-3'-nitrobenzene | 2-chloroaniline | Greenish khaki. |
| Do | 1-amino-2-chloro-5-trifluoromethylbenzene | Do. |
| Do | 1-amino-2-methyl-5-chlorobenzene | Brown olive. |
| Do | 2-amino-4-chlorodiphenylether | Olive. |
| Do | 2,5-dichloroaniline | Yellowish khaki. |
| 1'-(3-hydroxyfluorene-2-carboylamino)-2'.3'-dimethylbenzene | 2-chloraniline | Do. |
| Do | 3-chloraniline | Greenish khaki. |
| Do | 3-nitroaniline | Yellowish khaki. |
| Do | 1-amino-2-methyl-5-nitrobenzene | Do. |
| Do | 1-amino-2-methoxy-5-nitrobenzene | Olive. |
| Do | 1-amino-2-methyl-3-chlorbenzene | Khaki. |
| Do | 1-amino-2-methyl-5-chlorbenzene | Olive. |
| Do | 1-amino-2-methoxy-benzene-5-sulfodiethylamide | Olive. |
| 1'-(3-hydroxyfluorene-2-carboylamino)-2'.4'-dimethylbenzene | 1-amino-2-methyl-5-nitrobenzene | Greenish khaki. |
| Do | 1-amino-methoxy-5-nitrobenzene | Olive. |
| Do | 1-amino-2-methoxy-benzene-5-sulfodiethylamide | Olive brown. |
| Do | 1-amino-2-methoxy-benzene-5-benzylsulfone | Do. |
| Do | 2-amino-4-chlorodiphenylether | Brown olive. |
| Do | 2-amino-4,4'-dichlorodiphenylether | Do. |
| 1'-(3-hydroxyfluorene-2-carboylamino)-2'.5'-dimethylbenzene | 1-amino-2-methyl-5-nitrobenzene | Greenish khaki. |
| Do | 1-amino-methoxy-5-nitrobenzene | Olive brown. |
| Do | 1-amino-2-methoxy-benzene-5-sulfodiethylamide | Do. |
| Do | 1-amino-2-methoxy-benzene-5-benzylsulfone | Khaki. |
| Do | 2-amino-4-chlorodiphenylether | Brown olive. |

| Coupling component | Diazo component | Shade |
|---|---|---|
| 1' - (3 - hydroxyfluorene - 2 - carboylamino) - 3'.4' - dimethylbenzene. | 2-chloroaniline | Yellowish khaki. |
| Do | 1-amino-2-methyl-5-nitrobenzene | Greenish khaki. |
| Do | 1-amino-2-methoxy-5-nitrobenzene | Do. |
| Do | 1-amino-2-methoxy-5-chlorobenzene | Do. |
| Do | 1-amino-2-methyl-5-chlorobenzene | Do. |
| Do | 2-amino-4-chloro-diphenylether | Olive. |
| Do | 2-amino-4,4'-dichloro-diphenylether | Do. |
| 1' - (3 - hydroxyfluorene - 2 - carboylamino) - 3',5' -dimethylbenzene. | 2-chloroaniline | Yellow-olive. |
| Do | 2,5-dichloroaniline | Yellow brown. |
| Do | 1-amino-2-methyl-5-nitrobenzene | Khaki. |
| Do | 1-amino-2-methoxy-5-nitrobenzene | Olive. |
| Do | 1-amino-2-methyl-4-chlorobenzene | Yellowish khaki. |
| Do | 1-amino-2-methyl-5-chlorobenzene | Olive-brown. |
| Do | 1-amino-2-methoxy-5-chlorobenzene | Olive. |
| Do | 1-amino-2-chloro-5-trifluoromethyl-benzene | Yellowish khaki. |
| Do | 1-amino-4-chloro-2-trifluoromethylbenzene | Yellow olive. |
| 1' - (3 - hydroxyfluorene - 2 - carboylamino) - 2' - methyl - 4'-methoxybenzene. | 1-amino-2-methyl-3-chlorobenzene | Yellow brown. |
| Do | 1-amino-2-methyl-4-chlorobenzene | Do. |
| Do | 1-amino-2-methyl-5-chlorobenzene | Do. |
| Do | 1-amino-2-methoxy-5-chlorobenzene | Olive brown. |
| Do | 1-amino-2-methyl-5-nitrobenzene | Khaki. |
| Do | 1-amino-2-methoxybenzene-5-sulfo-diethylamide | Yellow brown. |
| Do | 1-amino-4-benzoylamino-2-chloro-5-methoxybenzene | Brown. |
| 1' - (3 - hydroxyfluorene - 2' - carboylamino) - 2'-methyl-5'-methoxybenzene. | 1-amino-2-methyl-5-nitrobenzene | Khaki. |
| Do | 1-amino-2-methoxy-5-nitrobenzene | Olive. |
| Do | 1-amino-2-methyl-5-chlorobenzene | Brown olive. |
| Do | 1-amino-2-methoxybenzene-5-sulfo-diethylamide | Olive brown. |
| Do | 1-amino-4-chloro-2-trifluoromethyl-benzene | Yellowish brown. |
| Do | 2-amino-4-chlorodiphenyloxide | Do. |
| 1' - (3 - hydroxyfluorene - 2 - carboylamino) - 3' - methyl-4'-methoxybenzene. | 1-amino-2-methyl-5-nitrobenzene | Olive brown. |
| Do | 1-amino-2-methoxy-5-nitrobenzene | Greenish khaki. |
| Do | 1-amino-2-methyl-5-chlorobenzene | Brown olive. |
| Do | 2-amino-4-chlorodiphenylether | Brownish olive. |
| Do | 2-amino-4,4'-dichlorodiphenylether | Do. |
| 1' - (3 - hydroxyfluorene - 2 - carboylamino) - 3' - methyl - 6'-methoxybenzene. | 2-chloroaniline | Yellow olive. |
| Do | 2,5-dichloroaniline | Do. |
| Do | 1-amino-2-methoxy-5-nitrobenzene | Khaki. |
| Do | 1-amino-2-methyl-4-chlorobenzene | Yellowish khaki. |
| Do | 1-amino-2-methyl-5-chlorobenzene | Do. |
| Do | 1-amino-2-methoxy-5-chlorobenzene | Do. |
| Do | 1-amino-2-chloro-5-trifluoro-methylbenzene | Yellow olive. |
| Do | 1-amino-2-methoxybenzene-5-sulfodiethylamide | Greenish khaki. |
| Do | 1-amino-2-methoxybenzene-5-benzylsulfone | Do. |
| 1'-(3-hydroxyfluorene-2-carboylamino)-3'-methoxy-4'-methylbenzene. | 3-chloraniline | Yellow olive. |
| Do | 1-amino-2-methyl-5-nitrobenzene | Olive brown. |
| Do | 1-amino-2-methoxy-5-nitrobenzene | Do. |
| Do | 1-amino-2-methoxy-5-chlorobenzene | Olive. |
| Do | 1-amino-2-methyl-5-chlorobenzene | Olive brown. |
| Do | 2-amino-4-bromodiphenylether | Brown olive. |
| 1'-(3-hydroxyfluorene-2-carboylamino)-2'-methyl-4'-chlorobenzene. | 3-chloroaniline | Khaki. |
| Do | 2-nitroaniline | Olive. |
| Do | 3-nitroaniline | Khaki. |
| Do | 4-nitroaniline | Do. |
| Do | 1-amino-2-methoxy-5-nitrobenzene | Olive. |
| Do | 1-amino-2-methyl-3-chlorobenzene | Khaki. |
| Do | 1-amino-2-methyl-4-chlorobenzene | Do. |
| Do | 1-amino-2-methyl-5-chlorobenzene | Yellowish brown. |
| Do | 1-amino-2-chloro-5-trifluoromethylbenzene | Khaki. |
| Do | 1-amino-3,5-di(trifluoromethyl) benzene | Yellow brown. |
| Do | 2-aminodiphenylsulfone | Olive. |
| Do | 1-aminoanthraquinone | Olivish dark brown. |
| 1'-(3-hydroxyfluorene-2-carboylamino)-2'-methyl-5'-chlorobenzene. | 2-chloroaniline | Yellowish khaki. |
| Do | 3-chloroaniline | Do. |
| Do | 3-nitroaniline | Do. |
| Do | 1-amino-2-methyl-5-nitrobenzene | Greenish khaki. |
| Do | 1-amino-2-methoxy-5-nitrobenzene | Brownish olive. |
| Do | 1-amino-2-methyl-3-chlorobenzene | Brown olive. |
| Do | 1-amino-2-methyl-5-chlorobenzene | Do. |
| Do | 1-amino-2-methoxybenzene-5-sulfodiethylamide | Olive brown. |
| Do | 1-amino-2-methoxybenzene-5-benzylsulfone | Greenish khaki. |
| 1'-(3-hydroxyfluorene-2-carboylamino)-2',4'-dimethoxybenzene. | 1-amino-2-methoxy-5-chlorobenzene | Khaki. |
| Do | 1-amino-2-methoxy-5-nitrobenzene | Brownish olive. |
| Do | 1-amino-2-methoxy-benzene-5-sulfodiethylamide | Khaki. |
| Do | 1-amino-2-methoxy-benzene-5-benzyl sulfone | Olive brown. |
| 1'-(3-hydroxyfluorene-2-carboylamino)-2'-methoxy-4'-chlorobenzene. | 1-amino-2-methyl-3-chlorobenzene | Yellow olive. |
| Do | 1-amino-2-methoxy-5-chlorobenzene | Brown olive. |
| Do | 1-amino-2-methoxy-4-nitrobenzene | Yellowish black brown. |
| Do | 1-amino-2-methoxy-5-nitrobenzene | Brownish olive. |
| Do | 1-amino-2-methoxybenzene-5-5-sulfodiethylamide | Greenish khaki. |
| Do | 1-amino-2-methoxybenzene-5-benzylsulfone | Olive brown. |
| Do | 2-aminodiphenylsulfone | Olive. |
| 1'-(3-hydroxyfluorene-2-carboylamino)-2'-methoxy-5'-chlorobenzene. | 2-nitroaniline | Greenish khaki. |
| Do | 1-amino-2-methyl-5-nitrobenzene | Yellowish khaki. |
| Do | 1-amino-2-methoxy-5-nitrobenzene | Greenish khaki. |
| Do | 1-amino-2-methyl-5-chlorobenzene | Yellowish khaki. |
| Do | 1-amino-2-methoxy-5-chlorobenzene | Olive brown. |
| Do | 1-amino-2,5-dichlorobenzene | Yellow brown. |
| Do | 1-amino-2-methoxy-4-nitrobenzene | Yellowish dark brown. |
| Do | 1-amino-2-methoxy benzene-5-sulfodiethylamide | Greenish khaki. |
| Do | 1-amino-2-methoxybenzene-5-ethylsulfone | Do. |
| Do | 1-amino-2-methoxybenzene-5-benzylsulfone | Do. |
| Do | 2-amino-4,4'-dichlorodiphenylether | Do. |
| Do | 2-amino-4-chlorodiphenylether | Olive. |

| Coupling component | Diazo component | Shade |
|---|---|---|
| 1'-(3-hydroxyfluorene-2-carboylamino)-3'-chloro-4'-methoxybenzene. | 1-amino-2-methyl-5-nitrobenzene | Greenish khaki. |
| Do | 1-amino-2-methoxy-5-nitrobenzene | Do. |
| Do | 1-amino-2-methyl-5-chlorobenzene | Khaki. |
| Do | 1-amino-2-methoxy-5-chlorobenzene | Brown olive. |
| Do | 1-amino-2-chloro-5-benzotrifluoride | Yellow-olive. |
| 1'-(3-hydroxyfluorene-2-carboylamino)-2',4'-dimethoxy-5-chlorobenzene. | 3-chloroaniline | Khaki. |
| Do | 2-nitroaniline | Olive-brown. |
| Do | 1-amino-2-methoxy-5-nitrobenzene | Khaki. |
| Do | 1-amino-2-methoxy-5-chlorobenzene | Greenish khaki. |
| Do | 1-amino-2-methoxy benzene-5-sulfodiethylamide | Khaki. |
| Do | 1-amino-2-methoxybenzene-5-benzylsulfone | Olivish khaki. |
| Do | 2-amino-4-chlorodiphenylether | Khaki. |
| 1'-(3-hydroxyfluorene-2-carboylamino)-2',5'-dimethoxy-4'-chlorobenzene. | 1-amino-2-methoxy-5-nitrobenzene | Do. |
| Do | 1-amino-2-methoxy benzene-5-sulfodiethylamide | Do. |
| Do | 1-amino-2-methoxybenzene-5-benzylsulfone | Do. |
| Do | 1-amino-2-chlorobenzene-5-benzotrifluoride | Yellowish brown. |
| Do | 2-amino-4-chlorodiphenylether | Olive-brown. |
| 1'-(3-hydroxyfluorene-2-carboylamino)-2'-methoxy-5'-methyl-4'-chlorobenzene. | 2-nitroaniline | Khaki. |
| Do | 3-nitroaniline | Do. |
| Do | 1-amino-2-methyl-5-chlorobenzene | Dark yellow brown. |
| Do | 1-amino-2-methoxybenzene-5-sulfodiethylamide | Khaki. |
| Do | 1-amino-2-methoxybenzene-5-ethylsulfone | Do. |
| Do | 1-amino-2-methoxybenzene-5-benzylsulfone | Do. |
| 1'-(3-hydroxyfluorene-2-carboylamino)-5', 6', 7', 8'-tetrahydro-naphthalene. | 2-chloroaniline | Yellowish khaki. |
| Do | 2.5-dichloroaniline | Olivish brown. |
| Do | 3-nitroaniline | Yellowish khaki. |
| Do | 1-amino-2-chloro-5-benzotrifluoride | Olivish brown. |
| Do | 1-amino-2-methyl-5-nitrobenzene | Khaki. |
| Do | 1-amino-2-methoxy-5-nitrobenzene | Greenish khaki. |
| Do | 1-amino-2-methyl-5-chlorobenzene | Yellowish khaki. |
| Do | 1-amino-2-methoxybenzene-5-sulfodiethylamide | Khaki. |
| Do | 1-amino-2-methoxybenzene-5-ethylsulfone | Greenish khaki. |
| Do | 0-amino-azotoluene | Dark brown. |
| 4', 4''-di-(3-hydroxyfluorene-2-carboylamino)-3', 3''-dimethoxy-diphenyl. | 1-amino-2-methyl-4-chlorobenzene | Yellow olive. |
| Do | 1-amino-2 methyl-5-chlorobenzene | Yellowish khaki. |
| Do | 1-amino-2-methoxy-5-nitrobenzene | Brown olive. |
| Do | 1-amino-2.5-dichlorobenzene | Yellow brown. |
| Do | 1-amino-3.5-di(trifluoromethyl)-benzene | Yellowish brown. |
| Do | 2-amino-4,4'-dichlorodiphenylether | Olive brown. |

Similar shades are obtained when using the amides of substituted 3-hydroxyfluorene-2-carboxylic acids:

| Coupling component | Diazo component | Shade |
|---|---|---|
| 1'-(6 - methyl - 3 - hydroxy - fluorene - 2 - carboylamino)-2'-methylbenzene. | 2-chloroaniline | Yellowish khaki. |
| Do | 1-amino-2-methyl-5-nitrobenzene | Khaki. |
| Do | 1-amino-2-methoxy-5-nitrobenzene | Brownish olive. |
| Do | 1-amino-2-methoxy-benzene-5-benzylsulfone | Olive brown. |
| Do | 1-amino-2-methoxy-benzene-5-sulfodiethylamide | Olive brown. |
| 1'-(6 - methyl - 3 - hydroxy - fluorene - 2 - carboylamino) - 2'-methoxybenzene. | 1-amino-2-methoxy-5-nitrobenzene | Green olive. |
| Do | 1-amino-2-methoxy-benzene-5-benzylsulfone | Do. |
| Do | 1-amino-2-methoxy-benzene-5-sulfodiethyl-amide | Greenish khaki. |
| 1'-(6 - methyl - 3 - hydroxy - fluorene - 2 - carboylamino)-2'5-'-dimethoxybenzene. | 1-amino-2-methyl-4-chlorobenzene | Yellow olive. |
| Do | 1-amino-2-methoxy-5-nitro-benzene | Olive brown. |
| Do | 1-amino-2-methoxy benzene-5-benzylsulfone | Greenish khaki. |
| Do | 1-amino-2-methoxybenzene-5-ethylsulfone | Khaki. |
| Do | 1-amino-2-methoxybenzene-5-sulfodiethylamide | Do. |
| 1'-(6,7 - benzo - 3 - hydroxyfluorene - 2 - carboylamino)-2'-methoxybenzene. | 2-chloroaniline | Yellowish brown. |
| Do | 1-amino-2-chloro-5-ω-trifluoro-methylbenzene | Brown. |
| Do | 1-amino-4-chloro-2-ω-trifluoro-methylbenzene | Do. |
| Do | 1-amino-2-methoxy-5-nitrobenzene | Olivish dark brown. |
| Do | 1-amino-2-methoxy-benzenesulfodiethylamide | Do. |
| Do | 1-amino-2-methoxy-benzene-5-benzyl-sulfone | Do. |

I claim:

1. Water insoluble azodyestuffs of the general formula

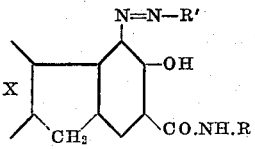

wherein R and R' stand for aromatic radicals and X stands for one of the group consisting of the benzene nucleus, the alkyl substituted benzene nucleus and the naphthalene nucleus, yielding, when produced on the fiber, shades of good fastness properties.

2. Water insoluble azodyestuffs of the general formula

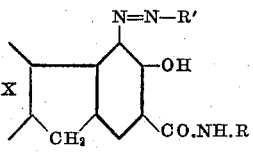

wherein R'—N=N stands for the radical of an aromatic diazo compound suitable for producing water insoluble azodyestuffs, R stands for a radical of the benzene series, and X stands for one of the group consisting of the benzene nucleus, the alkyl substituted benzene nucleus and the naphthalene nucleus, yielding, when produced on the fiber, shades of good fastness properties.

3. Water insoluble azodyestuffs of the general formula

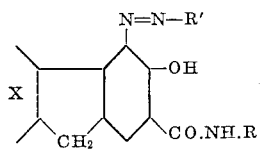

wherein R and R' stand for radicals of the benzene series and X stands for one of the group consisting of the benzene nucleus, the alkyl substituted benzene nucleus and the naphthalene nucleus, yielding, when produced on the fiber, shades of good fastness properties.

4. The water insoluble azodyestuff of the formula:

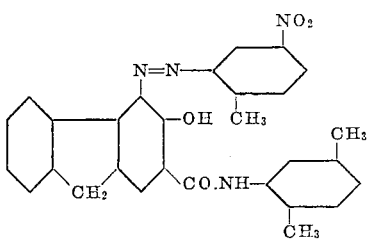

dyeing the cellulosic fiber greenish khaki shades of good fastness properties.

5. The water insoluble dyestuff of the formula

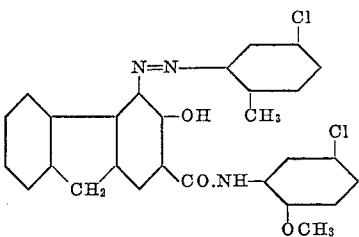

dyeing the cellulosic fiber yellowish khaki shades of good fastness properties.

6. The water insoluble dyestuff of the formula

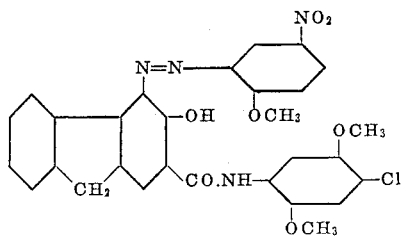

dyeing the cellulosic fiber khaki shades of good fastness properties.

7. Fibers dyed with a dyestuff as claimed in claim 1.
8. Fibers dyed with a dyestuff as claimed in claim 2.
9. Fibers dyed with a dyestuff as claimed in claim 3.
10. Fibers dyed with a dyestuff as claimed in claim 4.
11. Fibers dyed with a dyestuff as claimed in claim 5.
12. Fibers dyed with a dyestuff as claimed in claim 6.

FRIEDRICH WILHELM MUTH.